US 6,352,471 B1

(12) United States Patent
Bange et al.

(10) Patent No.: US 6,352,471 B1
(45) Date of Patent: Mar. 5, 2002

(54) ABRASIVE BRUSH WITH FILAMENTS HAVING PLASTIC ABRASIVE PARTICLES THEREIN

(75) Inventors: Donna W. Bange, Eagan; David E. Johnson, Maplewood; Mara E. Liepa, St. Paul; Richard M. Pihl, Cottage Grove, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/548,890

(22) Filed: Apr. 13, 2000

Related U.S. Application Data

(63) Continuation of application No. 08/979,887, filed on Nov. 26, 1997, now abandoned, which is a division of application No. 08/871,477, filed on Jun. 9, 1997, now abandoned, which is a continuation of application No. 08/767,086, filed on Dec. 16, 1996, now abandoned, which is a continuation of application No. 08/558,718, filed on Nov. 16, 1995, now abandoned.

(51) Int. Cl.$^7$ ............................................. B24D 11/00
(52) U.S. Cl. ........................ 451/527; 451/550; 451/533
(58) Field of Search ................... 451/527, 540, 451/528, 530, 532, 533, 536, 298; 15/230.12, 230.14, 230.15, 230.16, 187, 180, 188

(56) References Cited

U.S. PATENT DOCUMENTS

| 2,328,998 A | 9/1943 | Radford ..................... 51/185 |
| 2,643,945 A | 6/1953 | Buckner ..................... 51/297 |
| 2,793,478 A | 5/1957 | Rohowetz ................... 51/188 |
| 2,920,947 A | 1/1960 | Burk et al. .................. 51/298 |
| 3,090,061 A | 5/1963 | Charvat ..................... 15/159 |
| 3,134,122 A | 5/1964 | Charvat ..................... 15/179 |
| 3,233,272 A | 2/1966 | Pambello |
| 3,260,582 A | 7/1966 | Zimmer, Jr. et al. ......... 51/293 |
| 3,522,342 A | 7/1970 | Nungesser et al. ........... 264/210 |

(List continued on next page.)

FOREIGN PATENT DOCUMENTS

| FR | 2 624 773 | 6/1989 | ........... B23D/61/18 |
| GB | 743 022 A | 1/1956 | |
| GB | 1327653 | 8/1973 | ............. B29F/1/00 |
| GB | 1480096 | 7/1977 | .............. C08J/5/14 |
| GB | 2 043 501 | 10/1980 | ........... B24D/11/00 |
| JP | 61-152373 | 7/1986 | ............. B24D/3/34 |
| WO | WO 95/23539 | 9/1995 | ............ A46D/1/00 |

OTHER PUBLICATIONS

J.H. Watts, Abrasive Monofilaments–Critical Factors that Affect Brush Tool Performance, SME Technical Paper MR88–138, Society of Manufacturing Engineers, Dearborn, Michigan, 1988.
N.R. Legge et al (eds.), The Contribution of Thermoplastic Elastomers in Polymer Blends, Chapter 12.7 in *Thermoplastic Elastomers*, Macmillan Publishing Company, New York, 1987.
Technical Data Sheet entitled *Fatigue Resistance and Some of the Factors That Affect Flex Life of Brush Filling Materials*, Bulletin No. 6, E.I. Du Pont de Nemours & Co., Wilmington, Delaware, Feb. 1978.
Brochure entitled "The Magic is the Media." From US Technology Corporation, Canton, Ohio, four pages (undated).

*Primary Examiner*—Derris H. Banks
(74) *Attorney, Agent, or Firm*—Gregory D. Allen

(57) ABSTRACT

Abrasive filaments including plastic abrasive particles interspersed in a thermoplastic matrix. The abrasive filaments can comprise monofilaments, coextruded core/sheath filaments, and coated preformed cores. Also disclosed are abrasive brush constructions using a plurality of such abrasive filaments mounted on a suitable substrate, and unitary injection molded abrasive brushes. Also disclosed are methods of making such filaments and brushes, and method of using such brushes.

22 Claims, 4 Drawing Sheets

U.S. PATENT DOCUMENTS

| | | | |
|---|---|---|---|
| 3,547,608 A | 12/1970 | Kitazawa | 51/294 |
| 3,562,968 A | 2/1971 | Johnson et al. | 51/389 |
| 3,577,839 A | 5/1971 | Charvat et al. | 15/179 |
| 3,618,154 A | 11/1971 | Muhler et al. | |
| 3,689,118 A | 9/1972 | Charvat et al. | 300/21 |
| 3,767,791 A | 10/1973 | Cordon et al. | 424/49 |
| 3,947,169 A | 3/1976 | Wolff et al. | 425/71 |
| 3,966,672 A | 6/1976 | Gaylord | 528/502 |
| 4,241,469 A | 12/1980 | Perazzo | 15/209 |
| 4,311,489 A | 1/1982 | Kressner | 51/298 |
| 4,314,827 A | 2/1982 | Leitheiser et al. | 51/298 |
| 4,507,361 A | 3/1985 | Twilley et al. | 428/373 |
| 4,585,464 A | 4/1986 | Haylock et al. | 51/298 |
| 4,623,364 A | 11/1986 | Cottringer et al. | 51/309 |
| 4,627,950 A | 12/1986 | Matsui et al. | 264/103 |
| 4,652,275 A | 3/1987 | Bloecher et al. | 51/298 |
| 4,744,802 A | 5/1988 | Schwabel | 51/309 |
| 4,770,671 A | 9/1988 | Monroe et al. | 51/293 |
| 4,799,939 A | 1/1989 | Bloecher et al. | 51/293 |
| 4,855,067 A | 8/1989 | Jakubicki | 252/174.25 |
| 4,866,888 A | 9/1989 | Murai et al. | 51/401 |
| 4,907,378 A | 3/1990 | Huppert | 51/330 |
| 4,945,687 A | 8/1990 | Scheider et al. | 51/394 |
| 4,952,651 A | 8/1990 | Kasai et al. | 526/201 |
| 4,994,312 A | 2/1991 | Maier et al. | 428/372 |
| 5,011,508 A | 4/1991 | Wald et al. | 51/293 |
| 5,016,311 A | 5/1991 | Young et al. | 15/88.3 |
| 5,061,294 A | 10/1991 | Harmer et al. | 51/295 |
| 5,083,840 A | 1/1992 | Young et al. | 300/21 |
| 5,137,542 A | 8/1992 | Buchanan et al. | 51/295 |
| 5,164,348 A | 11/1992 | Wood | 501/127 |
| 5,174,795 A | 12/1992 | Wiand | |
| 5,203,884 A | 4/1993 | Buchanan et al. | 51/295 |
| 5,233,719 A | 8/1993 | Young et al. | 15/179 |
| 5,269,874 A | 12/1993 | Winter | 156/584 |
| 5,273,559 A | 12/1993 | Hammar et al. | 51/298 |
| 5,352,254 A | 10/1994 | Celikkaya | 51/295 |
| 5,369,916 A | 12/1994 | Jefferies et al. | 451/532 |
| 5,400,458 A | 3/1995 | Rambosek | 15/179 |
| 5,427,595 A | 6/1995 | Pihl et al. | 51/298 |
| 5,427,854 A | 6/1995 | Goodrich et al. | 428/372 |
| 5,443,906 A | 8/1995 | Pihl et al. | 51/298 |
| 5,460,883 A | 10/1995 | Barber, Jr. et al. | 428/370 |
| 5,491,025 A | 2/1996 | Pihl et al. | 51/298 |
| 5,500,273 A | 3/1996 | Holmes et al. | |
| 5,512,369 A | 4/1996 | Goodrich et al. | 428/372 |
| 5,679,067 A * | 10/1997 | Johnson et al. | 451/527 |
| 5,903,951 A | 5/1999 | Ionta | |
| 5,915,436 A * | 6/1999 | Johnson et al. | 15/187 |

* cited by examiner

ABRASIVE BRUSH WITH FILAMENTS HAVING PLASTIC ABRASIVE PARTICLES THEREIN

This is a continuation of application Ser. No. 08/979,887 filed Nov. 26, 1997, now abandoned, which is a Divisional of application Ser. No. 08/871,477 filed Jun. 9, 1997, now abandoned, which is a Continuation of application Ser. No. 08/767,086 filed Dec. 16, 1996, now abandoned, which is a Continuation of application Ser. No. 08/558,718 filed Nov. 16, 1995, now abandoned.

TECHNICAL FIELD

The present invention relates to abrasive filaments, methods of making the abrasive filaments and methods of refining a surface with the abrasive filaments. The abrasive filaments comprise a thermoplastic matrix and plastic abrasive particles.

BACKGROUND OF THE INVENTION

Polyamide, also known as "Nylon", filaments were developed in the late 1950's as a synthetic alternative to natural filaments. At about that time an extrusion process was developed for dispersing abrasive particles uniformly in a nylon matrix in the form of a filament (U.S. Pat. Nos. 3,522,342 and 3,947,169). A review of polyamide abrasive filaments is presented by Watts, J. H., "Abrasive Monofilaments-Critical Factors that Affect Brush Tool Performance", Society of Manufacturing Engineers Technical Paper, 1988, a written version of a presentation by the author at the WESTEC Conference, held Mar. 21–24, 1988. It is known to use conventional inorganic abrasive particles with such polyamide filaments. As explained by Watts, as filaments of this type wear, new abrasive particles are exposed. An abrasive filament brush tool made using a plurality of these filaments is thus regenerated during use.

While adequate for many purposes, various polyamides have property limitations which make their use less than optimal for certain applications of abrasive filaments. U.S. Pat. No. 5,427,595, Pihl et al., addresses such limitations and describes the use of thermoplastic elastomers in abrasive filaments to reduce or overcome such limitations. The filaments of Pihl et al. include a core component and a sheath component which are coextruded. Either or both of the core and sheath includes abrasive particles adhered therein. Pihl et al. teaches the use of conventional inorganic abrasive particles, although the claims of Pihl et al. are not limited to any particular type of abrasive particle.

U.S. Pat. No. 5,460,883, Barber, Jr., et al., also addresses the limitations of polyamides and describes the use of thermoplastic elastomers in abrasive filaments to reduce or overcome such limitations. The filaments of Barber et al. include a preformed core component and a sheath component coated onto the core to form a composite filament. The coated sheath includes abrasive particles adhered therein. Barber et al. teaches the use of conventional inorganic abrasive particles, although the claims of Barber et al. are not limited to any particular type of abrasive particle.

Brushes incorporating abrasive bristles or filaments have been used for many years to polish, clean and abrade a wide variety of substrates. These brush products typically have a plurality of bristles or filaments that contact the substrate. Abrasive particles can be added to bristles to increase their abrasiveness. The brushes may be made as follows. A mixture of abrasive particles and any suitable thermoplastic binder may be combined and then extruded to form a bristle or abrasive filament. The abrasive filament is then cut to the desired length. A plurality of these abrasive filaments are then mechanically combined to form a brush segment. Next, a plurality of these brush segments may be installed on a hub or plate to form a brush.

The abrasive particles typically employed in abrasive filaments and brushes described above have been limited to inorganic particles which necessarily have a high hardness, e.g. greater than 7 and usually greater than 9 on the Mohs hardness scale. The abrasive particles are sufficiently temperature resistant so as not to be deleteriously affected by the bristle or filament manufacturing process. Such abrasive particles are used in abrasive filaments and brushes to refine the surface of a workpiece. In some instances, this refinement is to remove a portion of the workpiece. In other instances, this refinement is to remove unwanted material (e.g., debris, oil residue, oxide layer, paint, etc.) from the workpiece surface. In some applications, it is desired to remove this unwanted material without any removal or abrasion of the underlying workpiece. However the abrasive particles in the abrasive filaments can be so "aggressive" that the abrasive filaments remove the unwanted material along with the workpiece surface.

U.S. Pat. Nos. 3,090,061 and 3,134,122 to Charvat disclose the use of plastic beads on hard wire bristles to maintain the desired spacing of the bristles when assembled into a brush. Charvat teaches that this is effective to properly space and control the bristles to prevent undue compacting of the brush face and to assure equal frequency of tip contacts per unit length of brush face. The preferred brush bristle taught by Charvat is a steel wire have a Knoop hardness of at least 600, and in some cases in excess of 700 and even in excess of 800. Charvat also teaches that the bristle material may comprise any suitable brush bristle, including nylon and glass filament bristles, and that the beads need not be apertured bodies on the bristles, but may be spaced globules and protuberances adhered to the bristles which are not necessarily concentric therewith. The plastic beads and bristles are coated with a thin plastic coating. Charvat does not teach or suggest that the plastic bead spacer or buffer can instead be used as an abrasive particle. In fact, Charvat teaches the use of bristle materials that are much harder and more abrasive than the plastic beads, and also suggests including conventional inorganic abrasive particles in the plastic beads. Charvat teaches that the plastic coating and beads will erode during operation and that the protruding bristle ends are adapted to operate on the work in the manner of a true brush.

What is desired is a filament having abrasive particles that can remove a foreign material from a workpiece surface efficiently without any damage to the underlying workpiece, or provide a desired fine finish to the workpiece surface, and in which the abrasive particles are sufficiently durable to withstand the filament manufacturing process.

SUMMARY OF THE INVENTION

This invention pertains to novel abrasive filaments including plastic abrasive particles, brush constructions containing such abrasive filaments, methods of making such abrasive filaments, and methods of refining a workpiece surface using the brush construction.

One embodiment pertains to an abrasive filament, comprising plastic abrasive particles interspersed in a thermoplastic matrix. In one preferred embodiment of the abrasive filament, the plastic abrasive particles have a greater hardness than the thermoplastic matrix Regarding this first embodiment, there are four major types of abrasive filaments. In the first type, the plastic abrasive particles are interspersed nearly uniformly and preferably uniformly throughout the thermoplastic matrix. In this first type, this results in a substantially homogeneous abrasive filament. In the second, third and fourth types, the abrasive filament comprises a sheath and a core. In the second type, the sheath comprises the thermoplastic matrix having the plastic abrasive particles interspersed throughout at least a portion thereof The core can comprise either a second thermoplastic material coextruded with the sheath, or a preformed core having the sheath coated over it. In the third type, the core comprises the thermoplastic matrix having the plastic abrasive particles interspersed throughout at least a portion thereof and the sheath comprises a second thermoplastic material. In the fourth type, the sheath and core both comprise a thermoplastic matrix having plastic abrasive particles interspersed throughout at least a portion thereof In these four embodiments, either the thermoplastic matrix and/or the plastic abrasive particles may be different between the sheath and core.

The term "interspersed" means that the abrasive particles are embedded within and located throughout the thermoplastic material that forms the filament. In the case of the core/sheath embodiments, "interspersed" means that the abrasive particles are embedded within and located throughout the thermoplastic matrix that forms the core or sheath, or both, as appropriate. The particles are interspersed so as to create a substantially homogenous distribution, though not necessarily an absolutely homogenous distribution. Furthermore, while the majority of the particles are wholly embedded within the thermoplastic matrix, this not preclude the possibility of having some exposed particles at the surface that extend partially outside of the thermoplastic matrix.

The term "thermoplastic matrix" means that the material is capable of being heated to a molten state and then subsequently cooled to a solid state. The thermoplastic matrix can be any thermoplastic polymer or thermoplastic elastomer. Examples of thermoplastic polymers suitable for this invention include polycarbonate, polyetherimide, polyester, polyethylene, polysulfone, polystyrene, acrylonitrilebutadienestyrene block copolymer, polypropylene, acetal polymers, polyurethanes, polyamides and combinations thereof Examples of thermoplastic elastomers useful in the present invention include polyester elastomers, polyurethane elastomers, polyamide elastomers, and silicone elastomer/polyamide block copolymeric, with the low and high equivalent weight polyfunctional monomers selected appropriately to produce the respective thermoplastic matrix.

"Thermoplastic elastomers" as used herein, refers to the class of polymeric substances which combine the processability (when molten) of thermoplastic materials with the functional performance and properties of conventional thermosetting rubbers (when in their non-molten state), and which are described in the art as ionomeric, segmented, or segmented ionomeric thermoplastic elastomers. The segmented versions comprise "hard segments" which associate to form crystalline hard domains connected together by "soft", long, flexible polymeric chains. The hard domain has a melting or disassociation temperature above the melting temperature of the soft polymeric chains.

The term "segmented thermoplastic elastomer", as used herein, refers to the sub-class of thermoplastic elastomers which are based on polymers which are the reaction product of a high equivalent weight polyfunctional monomer and a low equivalent weight polyfunctional monomer.

Segmented thermoplastic elastomers are preferably the condensation reaction product of a high equivalent weight polyfunctional monomer having an average functionality of at least 2 and an equivalent weight of at least about 350, and a low equivalent weight polyfunctional monomer having an average functionality of at least about 2 and an equivalent weight of less than about 300. The high equivalent weight polyfunctional monomer is capable on polymerization of forming a soft segment, and the low equivalent weight polyfunctional monomer is capable on polymerization of forming a hard segment. Segmented thermoplastic elastomers useful in the present invention include segmented polyester thermoplastic elastomers, segmented polyurethane thermoplastic elastomers, segmented polyurethane thermoplastic elastomers blended with other thermoplastic materials, segmented polyamide thermoplastic elastomers, ionomeric thermoplastic elastomers, and silicone elastomer/polyamide block copolymeric, with the low and high equivalent weight polyfunctional monomers selected appropriately to produce the respective thermoplastic matrix.

The segmented thermoplastic elastomers preferably include "chain extenders", low molecular weight (typically having an equivalent weight less than 300) compounds having from about 2 to 8 active hydrogen functionality, which are known in the art. Particularly preferred examples include ethylene diamine and 1,4-butanediol.

"Ionomeric thermoplastic elastomers" refers to a sub-class of thermoplastic elastomers based on ionic polymers (ionomers). Ionomeric thermoplastic elastomers are composed of two or more flexible polymeric chains bound together at a plurality of positions by ionic associations or clusters, each ionic cluster being analogous to a hard crystalline domain in a elastomers comprising segmented polymers. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene, and similar comonomers by free-radical copolymerization. The resulting copolymer is generally available as the free acid, which can be neutralized to the degree desired with metal hydroxides, metal acetates, and similar salts.

Blends of thermoplastic elastomers and thermoplastic materials are also within the invention, allowing even greater flexibility in tailoring mechanical properties of filaments of the invention.

As used herein, the term "hardened" refers to the physical state of the thermoplastic materials when the temperature of the thermoplastic polymer or thermoplastic elastomer is below the melting or dissociation temperature. The term can also be used to describe the room temperature (i.e. about 10 to about 40° C.) hardness (Shore D scale) of the thermoplastic material. It is preferred that the room temperature Shore D durometer hardness of the thermoplastic materials used in the invention be at least about 30, more preferably ranging from about 30 to about 90, as determined by ASTM D790. The term is not meant to include physical and/or chemical treatment of the thermoplastic matrix or thermoplastic elastomer/plastic abrasive particle mixture to increase its hardness.

The term "plastic abrasive particles" means that there are discrete entities or particulates present in the thermoplastic matrix. The term "plastic" means that the abrasive particles are formed from an organic material. It is preferred that the particles be formed from either a thermosetting or thermoplastic polymer. Examples of such plastic abrasive particles include polypropylene, polyester, polycarbonate, polystyrene, methacrylate, methylmethacrylate, and polyvinylchloride. Still other examples of plastic abrasive particles include the crosslinked polymers of phenolic, epoxy, ureaformaldehyde, acrylate, and melamine-formaldehyde based materials.

"Preformed core", as used herein, means one or more core elements which is formed in a step separate from and prior to one or more coating steps, one of which coats the preformed core with thermoplastic sheath; in other words, a preformed core is not made simultaneously with the hardened composition. The cross-section of the preformed core is not limited as to shape; however, preformed cores having substantially round or rectangular cross-sections have been found suitable.

The preformed core preferably extends through the entire length of the filament, but this is not required. It is also not required that the preformed core cross-section have the same cross-section as the overall filament, and the preformed core and hardened composition can be concentric or eccentric, with a single or plurality of core elements being within the invention.

The preformed core can be continuous individual metallic wires, a multiplicity of continuous individual metallic wires, a multiplicity of non-metallic continuous filaments, or a mixture of the latter two, provided that the melting temperature of the preformed core is sufficiently high so that a coating of abrasive-filled molten thermoplastic can be applied to at least a portion of the preformed core, and the molten thermoplastic cooled rapidly enough to maintain the integrity of the preformed core.

Preferred preformed cores include single and multi-stranded metallic cores, e.g., plain carbon steels, stainless steels, and copper. Other preferred preformed cores include a multiplicity of non-metallic filaments e.g., glass, ceramics, and synthetic organic polymeric materials such as aramid, polyamide, polyester, and polyvinyl alcohol.

The second embodiment pertains to an abrasive brush construction, comprising a plurality of abrasive filaments having plastic abrasive particles.

In one form of this embodiment, the abrasive brush comprises:

(a) a plurality of abrasive filaments, at least a portion of which comprise a thermoplastic matrix and plastic abrasive particles distributed in the thermoplastic matrix to form the abrasive filament;

(b) a means to secure the plurality of abrasive filaments together to form a brush construction.

The filaments of the invention can be incorporated into brushes of many types and for myriad uses, such as cleaning, deburring, radiusing, imparting decorative finishes onto metal, plastic, glass substrates, and like uses. Brush types include wheel brushes, cylinder brushes (such as printed circuit cleaning brushes), mini-grinder brushes, floor scrubbing brushes, cup brushes, end brushes, channel brushes, flared cup end brushes, circular flared end cup brushes, coated cup and variable trim end brushes, encapsulated end brushes, pilot bonding brushes, tube brushes of various shapes, coil spring brushes, flue cleaning brushes, chimney and duct brushes, and the like. The filaments in any one brush can of course be the same or different. A nonlimiting list of exemplary brushes in which the plastic particle filled filaments can be used include brushes such as described in U.S. Pat. Nos. 5,016,311, 5,083,840, and 5,233,719 (Young et al.), and U.S. Pat. No. 5,400,458 (Rambosek), the entire disclosures of all of which are incorporated herein by reference.

In another form of the brush embodiment, the brush is a unitary injection molded brush. The brush can be as described in co-pending U.S. Pat. No. 5,679,067, "Molded Abrasive Brush", (Johnson et al.). Johnson et al. discloses an integrally molded abrasive brush for rotary tools, comprising a generally planar flexible base having a first side and a second side, and a plurality of bristles extending from the first side of the base. The bristles have an aspect ratio of at least 2 and are integrally molded with the base. The molded abrasive brush comprises a thermoplastic matrix which includes abrasive particles interspersed throughout at least the bristles. The bristles extend generally perpendicular to the base, parallel to the axis of rotation of the molded abrasive brush.

Another form of a unitary injection molded brush is disclosed in U.S. patent application Ser. No. 08/559,334, "Radial Brush Segment," (Ionta et al.), filed even date herewith and assigned to the assignee of the present application. Ionta et al. discloses a molded brush segment having a plurality of integrally molded bristles extending from a generally planar center portion. The brush segment is molded from a thermoplastic matrix which includes a plurality of abrasive particles interspersed throughout at least the bristles. The molded brush segments can be generally circular, with the bristles extending radially outward in the plane defined by the central portion. A plurality of brush segments can be combined to form a brush assembly.

The third embodiment of the present invention pertains to a method of refining a workpiece surface. The method comprises the steps of:

(a) providing a workpiece having an outer surface, (b) providing an abrasive brush, wherein the abrasive brush comprises:
   (i) abrasive filaments comprising plastic abrasive particles distributed in the thermoplastic matrix to form the abrasive filament;
   (ii) a means to secure a plurality of abrasive filaments together to form a brush construction; and (c) moving the brush relative to the workpiece to remove a portion of the workpiece outer surface.

A variation on the third embodiment is a method comprising:

(a) providing an abrasive brush comprising:
   (i) a plurality of abrasive filaments comprising plastic abrasive particles distributed in a thermoplastic matrix, and
   (ii) means to secure said plurality of abrasive filaments together to form the brush;

(b) contacting the plurality of abrasive filaments against a workpiece surface, wherein the workpiece surface includes a foreign material thereon, and (c) moving the abrasive brush relative to the workpiece to remove the foreign material from the workpiece surface. In some instances the abrasive brush will remove a portion of the underlying workpiece while removing the foreign material. In other instances, the abrasive brush will not remove a significant amount of material of the workpiece outer surface.

Other aspects and advantages of the invention will become apparent from the detailed description which follows.

DESCRIPTION OF PREFERRED EMBODIMENTS

As previously described, the present invention presents an abrasive filament comprising a thermoplastic matrix having plastic abrasive particles dispersed therein.

Abrasive Filament

It is preferred that the abrasive filament have an aspect ratio of at least 1, preferably at least five, more preferably at least 10 and most preferably at least 20. The aspect ratio is defined as the length divided by the arithmetic average width. The filaments can be of any length or width desired, and the cross-sectional shape can of course be round, oval, square, triangular, rectangular, polygonal, or multilobal (such as trilobal, tetralobal, and the like) in cross-section. Additionally, the abrasive filaments may have a variable cross sectional area. For example, the filaments can be "wavy" or textured. Likewise, the filaments can be tapered.

There are four major types of abrasive filaments. In the first type, the plastic abrasive particles are interspersed nearly uniformly and preferably uniformly throughout the thermoplastic matrix. This first type results in a substantially homogeneous abrasive filament. In the second, third, and fourth types, the abrasive filament comprises a sheath and a core, wherein the sheath and core are preferably made from different materials. Such filaments are disclosed in U.S. Pat. No. 5,427,595, "Abrasive Filaments Comprising Abrasive-Filled Thermoplastic Elastomer, Method of Making Same, Articles Incorporating Same and Methods of Using Said Articles," (Pihl et al.); and in U.S. Pat. No. 5,460,883, "Composite Abrasive Filaments, Methods of Making Same, Articles Incorporating Same, and Methods of Using Said Articles," (Barber, Jr., et al), the entire disclosures of both of which are incorporated herein by reference. In the second type, the sheath comprises the thermoplastic matrix having plastic abrasive particles interspered throughout at least a portion thereof. The core can comprise either a second thermoplastic matrix coextruded with the sheath as taught by Pihl et al., or a preformed core with a hardened sheath coated over it as taught by Barber et al. In the third type, the sheath comprises a second thermoplastic matrix and the core comprises the thermoplastic matrix having plastic abrasive particles interspersed throughout at least a portion thereof In the fourth type, the sheath and core both comprise a thermoplastic matrix having plastic abrasive particles interspersed throughout at least a portion thereof. In the fourth embodiment, either the thermoplastic matrix and/or the plastic abrasive particles are preferably different between the sheath and core.

Figure 1:
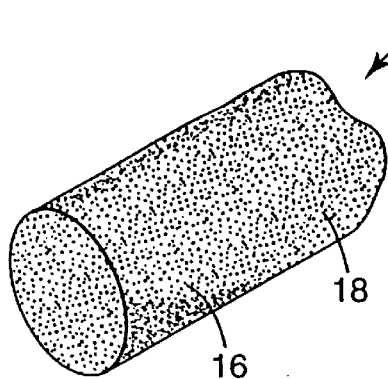
FIG. 1 is a perspective view of an embodiment of an abrasive filament accordance to the present invention.

FIG. 1 shows an enlarged perspective view of filament 10, comprising thermoplastic matrix 15 having plastic abrasive particles 18 interspersed throughout.

Figure 2:
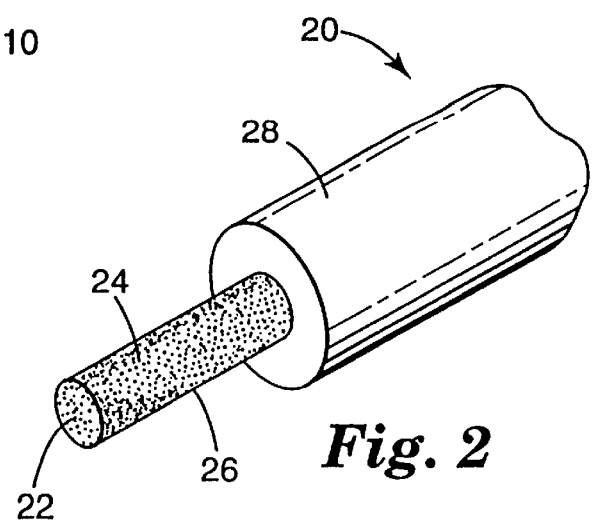
FIGS. 2–8 each are an enlarged perspective view of a respective embodiment of an abrasive filament according to the present invention, having a portion of its sheath removed to show the core.
Figure 3:
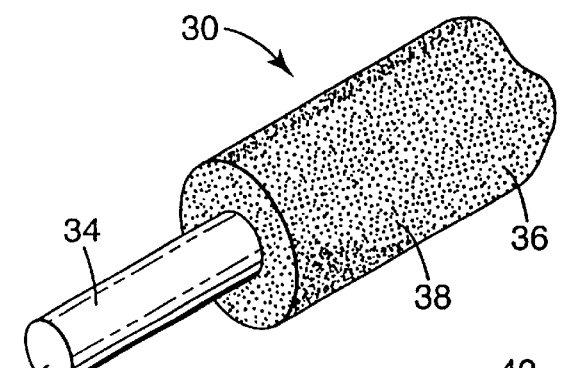
Figure 4:
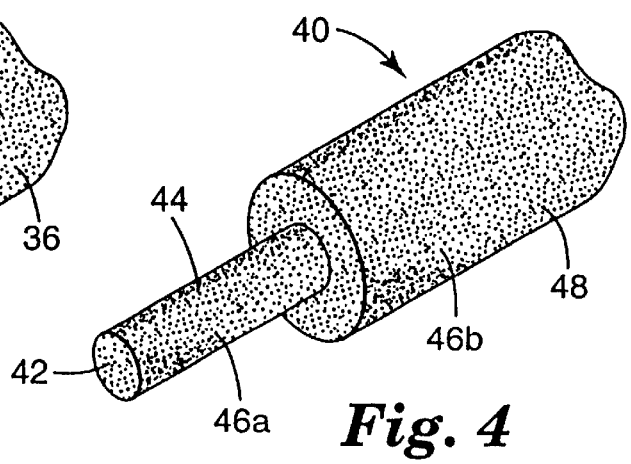

Three coextruded core-sheath embodiments 20, 30, and 40 of abrasive filaments in accordance with the present invention are illustrated in enlarged perspective views in FIGS. 2–4, where in each embodiment it will be appreciated that a portion of the sheath has been removed to show the respective cores. It will also be appreciated that the core or sheath (or both) containing the abrasive particles may have only a section or portion of the core or sheath so filled. In the embodiments illustrated in FIGS. 4–8, either or both of the core and sheath can comprise a thermoplastic elastomer or a thermoplastic, or blends thereof Referring now to FIG. 2, an abrasive filament 20 has a first elongate filament component in the form of core 22, including a thermoplastic matrix 24 and plastic abrasive particles 26. Abrasive filament 20 also has a second elongate filament component in the form of sheath 28 coextruded with core 22. The thermoplastic matrix 24 of the elongate filament component core 22 has interspersed throughout and adhered therein a plurality of plastic abrasive particles 26.

FIG. 3 illustrates an alternate abrasive filament embodiment 30, wherein the first elongate filament component is in the form of a core 32 and the coextruded sheath is formed from thermoplastic matrix 38 which has interspersed throughout and adhered within a plurality of abrasive particles 36. In this embodiment, only the sheath includes abrasive particles.

FIG. 4 illustrates another core-sheath abrasive filament embodiment 40 having a first filament component in the form of core 42 comprising first thermoplastic matrix 44 and a second filament component in the form of a coextruded sheath comprising a second thermoplastic matrix 48, and wherein both core and sheath include abrasive particles 46a and 46b, respectively. Abrasive particles 46a and 46b may of course be the same or different in terms of type, particle size, particle size distribution, and distribution within the core and sheath. At least one of abrasive particles 46a and 46b comprises plastic particles in accordance with the present invention. It is within the scope of the present invention that the core and sheath each comprise abrasive particles, where the abrasive particles can be the same or different between the core and sheath. Alternatively, one of the core and sheath can comprise inorganic abrasive grains and the other of the core and sheath can comprise plastic abrasive particles.

The abrasive filaments as shown schematically in FIGS. 2–4 may have core and total abrasive filament diameters within a broad range, limited only by the size of the apparatus used produce the molten thermoplastic matrix, and the article to which the abrasive filaments are to be attached. Obviously, as the diameter of the abrasive filament increases, the number of abrasive filaments which can be attached to a substrate, such as a hub of a given size, decreases. Core diameters, for abrasive filaments of the present invention which are core-sheath structures, for abrasive filaments used in typical hand-held tools, are preferably at least about 0.1 mm, while the abrasive filaments themselves preferably have a diameter ranging from about 1.0 mm to about 2.0 mm. These dimensions could, of course, increase tremendously for a large abrading device, and abrasive filaments having much larger core and total diameters are considered within the scope of the appended claims Four embodiments 50, 60, 70, and 80 of composite abrasive filaments in accordance with the present invention are illustrated in enlarged perspective views in FIGS. 5–8, where in each embodiment it will be appreciated that a portion of the sheath comprising the thermoplastic matrix and plastic abrasive particles has been removed to show the preformed cores.

Figure 5:
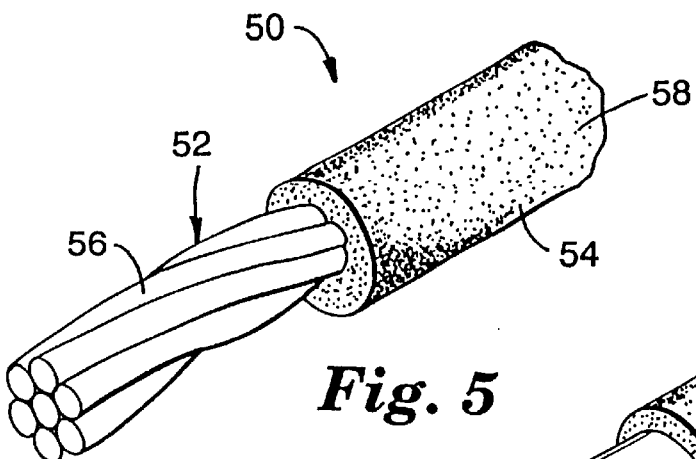

FIG. 5 shows an enlarged perspective view of composite abrasive filament 50, having a preformed core 52 covered by a hardened sheath coating of thermoplastic matrix 54 and plastic abrasive particles 58. Preformed core 52 in this embodiment is a 1×7 stranded preformed core, formed for example from seven individual stainless steel wires 16. The thermoplastic matrix of the sheath has interspersed throughout and adhered therein a plurality of plastic abrasive particles 58.

Figure 6:
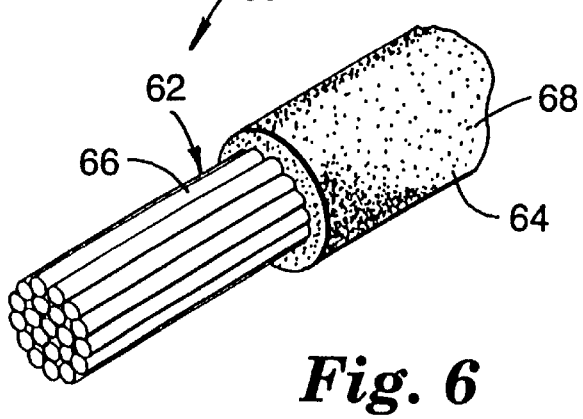
Figure 7:
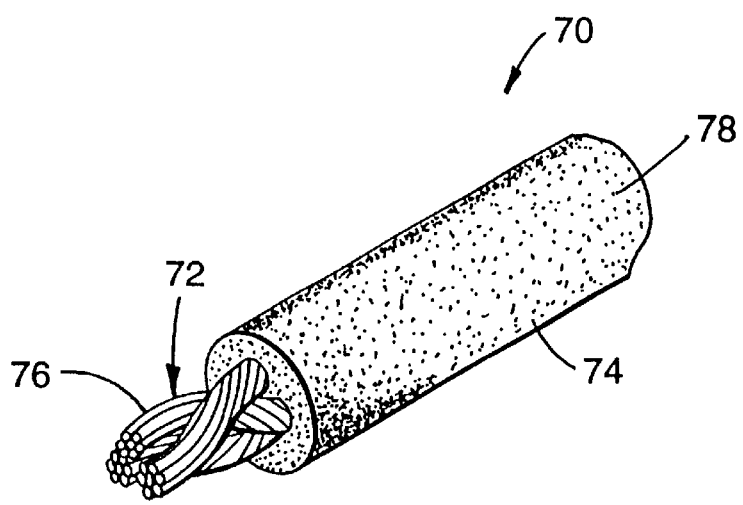

FIG. 6 shows an alternate composite abrasive filament embodiment 60, wherein the preformed core 62 is formed from a plurality of parallel, continuous metallic wires or non-metallic monofilaments 66, while FIG. 7 shows a second alternate embodiment 70, wherein the preformed core 72 is a cable having a 3×7 arrangement of three strands 76, the strands in turn being each 1–7 strands of seven individual metallic wires or non-metallic monofilaments as in FIG. 5. The composite abrasive filaments 60 and 70 each have a hardened sheath coating of thermoplastic matrix 64, 74 having plastic abrasive particles 68, 78 interspersed throughout and adhered therein covering preformed cores 62 and 72, respectively. Regarding the embodiment shown in FIG. 6, it should be noted that the sheath coating can be between the parallel monofilaments of the preformed core, so that the individual monofilaments may be equally or unequally spaced apart.

Figure 8:
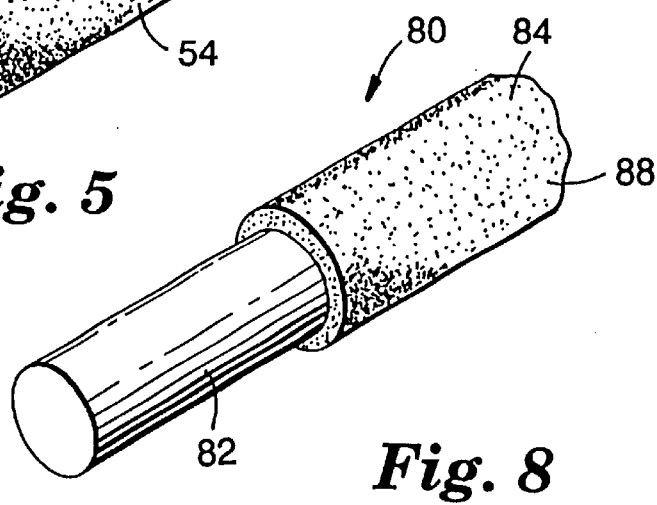

FIG. 8 shows an enlarged perspective view of another composite abrasive filament embodiment 80 in accordance with the present invention. Preformed core 82 in this embodiment is a single continuous wire or monofilament of, for example, stainless steel or glass fiber. As with previous embodiments, core 82 has thereon a hardened sheath coating of thermoplastic matrix 14 having interspersed throughout and adhered therein a plurality of plastic abrasive particles 88.

The composite abrasive filaments as shown schematically in FIGS. 5–8 may have preformed core and total composite abrasive filament diameters within a broad range, limited only by the size of the apparatus used to coat the preformed core with the sheath coating of thermoplastic matrix, and the article to which the composite abrasive filaments are to be attached. Obviously, as the preformed core diameter of the composite abrasive filament increases, the number of composite abrasive filaments which can be attached to a substrate, such as a hub of a given size, decreases. Preformed core diameters for composite abrasive filaments of the present invention used on typical hand-held tools are preferably at least about 0.1 mm, while the composite abrasive filaments themselves preferably have a diameter ranging from about 1.0 mm to about 2.0 mm. These dimensions could, of course, increase tremendously for a large abrading device, and composite abrasive filaments having much larger preformed core and total diameters are considered within the scope of the appended claims.

Preformed Cores

Preformed core materials useful in the present invention can be envisioned as an abrasive coating substrate that can be selected or modified in its surface characteristics, mechanical properties, and environmental stability properties. The preformed core material is preferably selected or capable of being modified so that its surface has the ability to achieve adhesion between the core and thermoplastic matrix coating. Important mechanical properties include tensile strength and flex fatigue resistance while operating under various chemical, thermal and atmospheric conditions.

Preformed cores useful in the filaments of the present invention include: metal wires such as stainless steel, copper, and the like; inorganic fibers such as glass and ceramic fibers; synthetic fibers, such as aramid, rayon, and the like; natural fibers such as cotton, and mixtures of these. Although continuous monofilaments may be used, preferred are stranded, cable, and yarn versions of these materials. "Stranded" as used herein refers to twisted together wires while "yarn" refers to twisted together nonmetallic monofilaments. Typical arrangements include 1×3, 1×7, and 3×7 arrangements, wherein the first number refers to the number of strands or yarns and the second number refers to the number of individual monofilaments or wires twisted together in each yarn or strand. "Cable" refers to two or more strands twisted together, while "plied yarns" refers to two or more yarns twisted together, preferably having the opposite direction of twist compared with the cables (for example, if the cables are twisted together "right handed" the plied yarn may be twisted together "left handed"). Alternatively, the performed core may be in the form of untwisted continuous wires or monofilaments. Preferred yarns include yarns of glass fibers, ceramic fibers, aramid fibers, polyamide fibers, polyethylene terephthalate fibers, cotton fibers, plied version thereof, and mixtures thereof.

The diameter of the preformed core is preferably at least about 0.01 mm, more preferably ranging from about 0.1 mm to about 0.7 mm, although there is actually no upper limit to the diameter other than that imposed by currently known methods of making filaments.

Some commercially available preformed core materials useful in the present invention include a 1×7 stranded stainless steel of 0.305 mm outside diameter (OD) available from National Standard, Specialty Wire Division, Niles, Mich.; a continuous glass filament yarn having about 204 monofilaments, known under the order number "ECH 18 1/0 0.5Z 603-0", referred to herein as "OCF H-18", and a similar glass filament yarn having an epoxy silane pretreatment and known under the order number "ECG 75 1/2 2.8 S 603-0" referred to herein as "OCF-G75", both available from Owens-Corning Fiberglass Corporation, Toledo, Ohio; yarns of aramid fibers known under the trade designation "Kevlar" (200–3000 denier, zero twist, type 964) manufactured and sold by duPont; and the plied yarns made of aramid, polyamide, and polyester fibers having textile designations #69, #92, and #138 (the numbers referring to the weight of the plied yarn), available from Eddington Thread Manufacturing Company, Bensalem, Pa.

In some preferred embodiments the preformed core will be treated with a pretreatment chemical such as an adhesive or sealant, which serves to adhere the thermoplastic matrix to the preformed core. One group of pretreatment chemicals useful when the preformed core is glass plied yarn is silane coupling agents such as epoxy silanes.

The sheath component of the sheath/core filament embodiment preferably covers the entire coextruded or preformed core, although this is not a requirement. The sheath could conceivably cover only that side of the core which strikes the workpiece, and filaments of this construction are considered within the scope of the invention. As would be obvious to skilled artisans, the sheath need not have the same outer configuration as the core; for example, the sheath could have a rectangular or triangular cross-section while the core is roughly circular in cross-section. When the sheath completely coats the core, as in the preferred filament constructions discussed above, the ratio of cross-sectional area of the sheath to the cross-sectional area of the core may vary within a broad range, from about 0.5:1 to about 100:1. More preferably, the ratio of cross-sectional areas ranges from about 1:1 to about 10:1, particularly preferably about 1:1 to about 3:1.

Thermoplastic Matrix

The term "thermoplastic matrix" means that the material is capable of being heated to a molten state and then subsequently cooled to a solid state. The thermoplastic matrix can be any thermoplastic polymer or thermoplastic elastomer. It is also within the scope of this invention to use blends of different thermoplastic polymers, thermoplastic elastomers, or blends of thermoplastic polymers with thermoplastic elastomers.

Thermoplastic Elastomers

In one aspect of this invention, the thermoplastic matrix may be a thermoplastic elastomer. Thermoplastic elastomers include those described in U.S. Pat. Nos. 5,427,595 and 5,460,883.

"Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques, such as injection molding, extrusion, blow molding, and the like. Subsequent cooling leads again to segregation of hard and soft regions resulting in a material having elastomeric properties, however, which does not occur with thermoplastics. Thermoplastic elastomers combine the processability (when molten) of thermoplastic materials with the functional performance and properties of conventional thermosetting rubbers (when in their non-molten state), and which are described in the art as ionomeric, segmented, or segmented ionomeric thermoplastic elastomers. The segmented versions comprise "hard segments" which associate to form crystalline hard domains connected together by "soft", long, flexible polymeric chains. The hard domain has a melting or disassociation temperature above the melting temperature of the soft polymeric chains.

Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

The mechanical properties of segmented thermoplastic elastomers (such as tensile strength and elongation at break) are dependent upon several factors. The proportion of the hard segments in the polymers which form the elastomers, their chemical composition, their molecular weight distribution, the method of preparation, and the thermal history of the elastomer all affect the degree of hard domain formation. Increasing the proportion of the low equivalent weight polyfunctional monomer tends to increase the hardness and the modulus of the resultant elastomer while decreasing the ultimate elongation.

The upper use temperature of segmented elastomers is dependent upon the softening or melting point of the low equivalent weight polyfunctional monomer comprising the hard segments. For long term aging, the stability of the high equivalent weight polyfunctional monomer comprising the soft segment is also important. At elevated temperatures and with a lower percentage of hard segments which can contribute to hard domains, bending modulus and tensile strength of the elastomers are generally reduced. As may be apparent to those skilled in the plastics processing art, to extend the upper useful temperature of a segmented elastomers, it is necessary to introduce low equivalent weight polyfunctional monomers adapted to form hard domains which soften or melt at higher temperatures. However, although increasing the amount of or equivalent weight of low equivalent weight polyfunctional monomers can lead to elastomer hardness, reduced elastic properties and reduced flex fatigue resistance of the filaments made therefrom may result.

Commercially available and preferred segmented polyesters include those known under the trade designations "Hytrel 4056", "Hytrel 5556", "Hytrel 6356", "Hytrel 7246", and "Hytrel 8238"available from DuPont. Particularly preferred are the versions having Shore D hardness of 63 and 72 ("Hytrel 6356"and "Hytrel 7246", respectively). Also preferred are "Hytrel" 5526, 5556, and 6356. A similar family of thermoplastic polyesters is available under the tradename "Riteflex", from Hoechst Celanese Corporation, Somerville, N.J. Still further useful polyesters are those known under the trade designation "Ecdel", from Eastman Chemical Products, Inc., Kingsport, Tenn.; "Lomad", from General Electric Company, Pittsfield, Mass.; "Arnitel" from DSM Engineering, Evansville, Ind.; and "Bexloy" from DuPont. Further useful polyester electronics include those available as "Lubricomp" from LNP Engineering Plastics, Exton, Pa., and is commercially available incorporating lubricant, glass fiber reinforcement, and/or carbon fiber reinforcement.

The hardened compositions comprising thermoplastic elastomer and plastic abrasive particles are of course not limited to those components. Glass fiber-reinforced polyester thermoplastic elastomers (trade designation "Thermocomp YF") are available from LNP Engineering Plastics.

Segmented polyamides are commercially available, such as those known under the trade designation "Pebax", and "Rilsan" available from Atochem Group Inc., Glen Rock, N.J with the 63 and 70 Shore D durometer versions being particularly preferred in the present invention.

Commercially available and preferred segmented polyurethanes are those known under the trade designation "Estane", available from B.F. Goodrich, Cleveland, Ohio, particularly grades 58409 and 58810. Other preferred segmented polyurethanes include those known under the trade designations "Pellethane", and "Isoplast" from The Dow Chemical Company, Midland, Mich., and those known under the trade designation "Morthane", from Morton Chemical Division, Morton Thiokol, Inc.,; and those known under the trade designation "Elastollan", from BASF.

As mentioned previously, blends of thermoplastic elastomers and other polymers have also proven useful, such as the polyurethane/acrylonitrile-butadienestyrene blends known under the trade designation "Prevail", grades 3050, 3100, and 3150, all from Dow Chemical.

Block copolymers regarded by those skilled in the plastics processing art as thermoplastic elastomers, including the elastomeric copolymers of silicones and polyimides, may also prove useful in filaments of the invention. Commercially available elastomeric copolymers of thermoplastic silicones and polyimides include those known under the trade designation "Siltem STM-1500", from GE Silicones, Waterford, N.Y. These copolymers have a tensile strength of about 25 MPa, elongation of 105%, and flexural modulus of about 415 MPa.

Ionomers which may behave as ionomeric thermoplastic elastomers and thus useful in the present invention, such as those ionomers known under the trade designation "SURLYN", are preferably prepared by copolymerization of a functionalized monomer and an olefinic unsaturated monomer, or by direct functionalization of a preformed polymer, as previously noted. The large quantity of commercial quality ethylene/methacrylic acid copolymers, for example containing between about 5 and about 20 weight percent methacrylic acid component, makes these ionomers particularly useful in the present invention.

Thermoplastic Polymers

Examples of thermoplastic polymers suitable for this invention include polycarbonate, polyetherimide, polyester, polyethylene, polysulfone, polystyrene, acrylonitrile-butadiene-styrene block copolymer, polypropylene, acetal polymers, polyurethanes, polyamides, and combinations thereof. In general, preferred thermoplastic polymers of the invention are those having a high melting temperature or good heat resistance properties.

One preferred thermoplastic material of the invention is polyamide and more preferably nylon. Nylon is characterized by having an amide group, i.e. CONH. Nylon 6/6 is a condensation product of adipic acid and hexamethylenediamine. Nylon 6/6 has a melting point of about 264° C., a tensile strength of about 9.0 g/denier and an elongation of about 17%. Nylon 6 is a polymer of caprolactoam. Nylon 6 has a melting point of about 223° C., a tensile strength of about 8.5 g/denier and an elongation of about 18%. Examples of commercially available nylon resins include "Vydyne" from Monsanto, St. Louis, Mo.; "Zytel" and "Minlon" both from E.I. DuPont de Nemours and Company, Inc., Wilmington, Del. (DuPont); "Torgamid T" from BASF Corporation, Parsippany, N.J.; "Capron" from Allied-Signal, Morristown, N.J.; "Nydur" from Miles, Pittsburgh, Pa., and "Ultramid" from BASF Corporation. Other examples of commercially available thermoplastic polymers suitable for use with the present invention include "Grilon CR9" copolymer of Nylon 6,12 available from EMS-American Grilon, Inc., Sumter, S.C.; "Profax" and KS075 polypropylene based thermoplastic available from Himont USA, Inc., Wilmington, Del.; and "Duraflex" polybutylene based thermoplastic available from Shell Chemical Co., Houston, Tex.

Plastic Abrasive Particles

The plastic abrasive particles of the present invention are organic based materials. They are preferably formed from either a thermoplastic polymer and/or a thermosetting polymer. Plastic abrasive particles useful in the filaments of the present invention may be individual particles or agglomerates of individual particles. The agglomerates may comprise a plurality of the plastic abrasive particles bonded together by a binder to form a shaped mass.

The plastic abrasive particles are preferably present in the thermoplastic matrix at a weight percent (per total weight of thermoplastic matrix and plastic abrasive particles) ranging from about 0.1 to about 80 weight percent, more preferably from about 3 to about 60 weight percent. The weight percentage depends in part on the particular abrading or brush applications.

In some applications, it may be preferred to provide aggressive abrasive characteristics, in which case the abrasive brush may comprise larger size abrasive particles, harder abrasive particles, a higher abrasive particle to binder ratio, or some combination of the above. In other applications, it may be preferred to provide a polish type finish to the surface being refined, or to clean a surface without removing surface material itself, in which case the abrasive brush may employ smaller abrasive particles, softer abrasive particles, lower particle to binder ratio, or some combination of the above. It is possible to employ abrasive particles of varied composition and hardness to obtain the desired abrading characteristics.

The size of the plastic abrasive particles incorporated into the thermoplastic matrix depends on the intended use of the filaments. For applications requiring cutting or rough finishing, larger plastic abrasive particles are preferred, while plastic abrasive particles having smaller size are preferred for finishing applications. Preferably, the average diameter of the particles is no more than about ½ the diameter of the filament, more preferably no more than about ⅓ of the diameter of the filament.

The plastic abrasive particles will have an average particle size from about 0.01 to about 500 micrometers, typically between about 0.1 to about 250 micrometers, preferably between about 1 to about 150 micrometers, more preferably between about 5 to about 100 micrometers and most preferably between about 5 to about 75 micrometers. The average particle size is typically measured by the longest dimension.

The plastic abrasive particles can have any precise shape or can be irregularly or randomly shaped. Examples of such three dimensional shapes includes: pyramids, cylinders, cones, spheres, blocks, cubes, polygons, and the like. Alternatively, the plastic abrasive particles can be relatively flat and have a cross sectional shape such as a diamond, cross, circle, triangle, rectangle, square, oval, octagon, pentagon, hexagon, polygon and the like.

The surface of the plastic abrasive particles (or a portion of their surface, or the entire surface of a portion of the particles may be treated with coupling agents to enhance adhesion to and/or dispersibility in the molten thermoplastic matrix. The plastic abrasive particles are not required to be uniformly dispersed in the hardened composition, but a uniform dispersion may provide more consistent abrasion characteristics.

The plastic abrasive particles can be formed from a thermoplastic material such as polycarbonate, polyetherimide, polyester, polyethylene, polysulfone, polystyrene, acrylonitrile-butadiene-styrene block copolymer, polypropylene, acetal polymers, polyurethanes, polyamide, and combinations thereof In general, preferred thermoplastic polymers of the invention are those having a high melting temperature, e.g. greater than 200° C., more preferably 300° C.; or good heat resistance properties. The plastic abrasive particles should have a higher melting or softening point than the thermoplastic matrix, so that the plastic particles are not substantially affected by the filament manufacturing process. The plastic particle should be capable of maintaining a generally particulate state during filament processing, and therefore should be selected so as not to substantially melt or soften during the filament manufacturing process. In one preferred embodiment, the plastic particles are selected to provide greater abrasive properties than the thermoplastic matrix, and both the sheath and core, if present. In this manner, the plastic abrasive particles will perform the desired surface refinement, such as removing foreign material form the workpiece or providing a fine surface finish, while the thermoplastic matrix wears away during operation to continuously present fresh plastic abrasive particles to the workpiece surface.

There are several ways to form a thermoplastic abrasive particle. One such method is to extrude the thermoplastic polymer into elongate segments and then cut these segments into the desired length. Alternatively, the thermoplastic polymer can be molded into the desired shape and particle size. This molding process can be compression molding or injection molding.

The plastic abrasive particles can be formed from a thermosetting polymer. Thermosetting polymers can be formed from: phenolic resins, aminoplast resins, urethane resins, epoxy resins, acrylate resins, acrylated isocyanurate resins, ureaformaldehyde resins, isocyanurate resins, acrylated urethane resins, melamine formaldehyde resins, acrylated epoxy resins and mixtures thereof Phenolic based abrasive particles are one preferred abrasive particles. There are two types of phenolic resins, resole and novolac. Resole phenolic resins have a molar ratio of formaldehyde to phenol, of greater than or equal to one to one, typically between 1.5:1.0 to 3.0:1.0. Novolac resins have a molar ratio of formaldehyde to phenol, of less than to one to one. Examples of commercially available phenolic resins include those known by the tradenames "Durez" and "Varcum" from Occidental Chemicals Co., Burlington, N.J.; "Resinox" from Monsanto; "Aerofene" and "Arotap" from Ashland Chemical Co., Columbus, Ohio. These phenolic resins are cured to thermosetting polymers. The resulting thermosetting polymers are then crushed to the desired particle size and particle size distribution. In alternative method, the thermosetting plastic abrasive particles can be made in accordance with the teachings of the Holmes et al. U.S. Pat. No. 5,500,273 incorporated herein after by reference.

The 5,500,273 patent discloses precisely shaped particles and methods for making these particles. The particles comprise a binder. In one desirable embodiment of the '273 patent, a plurality of abrasive grits is dispersed in the binder.

One preferred method described in the '273 patent comprises the steps of:

(a) providing a production tool having a three-dimensional body which has at least one continuous surface, said surface containing at least one opening formed in said continuous surface, said at least one opening providing access to a cavity in said three-dimensional body;

(b) providing a dispensing means capable of introducing a binder precursor comprising a thermosetting resin into said at least one cavity through said at least one opening;

(c) providing a means, within a curing zone, for at least partially curing said binder precursor;

(d) introducing said binder precursor into at least a portion of said at least one cavity;

(e) continuously moving said at least one cavity through said curing zone to at least partially cure said binder precursor to provide a solidified, handleable binder having a shape corresponding to that portion of the cavity into which the binder precursor had been introduced;

(f) removing said binder from said at least one cavity; and (g) converting said binder to form a precisely shaped particle.

Steps (f) and (g) can be conducted simultaneously.

In a preferred embodiment, a plurality of abrasive grits is included with the binder precursor in step (d), and a binder containing abrasive grits is formed in step (e). The binder that contains abrasive grits is removed from the at least one cavity of the production tool in step (f). Materials other than abrasive grits can be included with the binder precursor.

The curing zone can contain a source of thermal energy, a source of radiation energy, or both. Suitable sources of radiation energy include electron beam, visible light, and ultraviolet light. In a variation of the general method, curing can be effected by thermal energy or by a combination of radiation energy and thermal energy.

The binder can be converted into particles by several means. In one means, when the binder is removed from the cavities of the production tool, it is released in the form of individual particles. These particles can contain additional materials or be free of additional materials. A typical material that can be included in these particles is abrasive grits. The resulting particles preferably have shapes that are essentially the same as the shapes of the cavities of the production tool. Thus, the particles have shapes that are determined by the shapes of the cavities of the production tool. In this first means, steps (f) and (g) are accomplished simultaneously, because the shaped particles have their characteristic form when they are released from the cavities of the production tool.

At least one continuous surface of the production tool contains at least one cavity, preferably a plurality of cavities. The solidified, handleable binder precursor will acquire a shape corresponding to the shape of the cavity. A cavity can have any geometric shape such as a pyramid, prism, cylinder, cone, or thin body having opposed polygonal faces. The geometric shapes can be truncated versions of the foregoing. It is preferred that the sides of the cavities have a slope associated them to allow easier removal of the binder from the production tool.

In one particularly useful embodiment, the binder precursor may contain abrasive grits. The cured binder precursor, i.e., the binder, functions to bond the abrasive grits together to form a precisely shaped abrasive particle. The abrasive grits typically have an average particle size ranging from about 0.1 to 1500 micrometers, preferably from about 1 to about 1300 micrometers, more preferably from about 1 to about 500 micrometers, and most preferably from about 1 to about 150 micrometers. It is preferred that the abrasive grits have a Mohs' hardness of at least about 8, more preferably above 9. Examples of materials of such abrasive grits include fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, and combinations thereof. The plastic abrasive particle may be a mixture of a thermoplastic polymer and a thermosetting polymer.

A particularly preferred organic abrasive particle is a metal and mold cleaning plastic blast media available commercially as "MC" blast media from Maxi Blast Inc., South Bend, Ind., available with an antistatic coating, but preferably untreated. The "MC" media is a 99% melamine formaldehyde cellulosate, an amino thermoset plastic.

The average knoop hardness of the plastic abrasive particle is generally less than about 80 KNH, and preferably less than about 65 KNH.

Inorganic Abrasive Particles

It is also within the scope of this invention to incorporate inorganic based abrasive particles along with the plastic abrasive particles. These inorganic abrasive particles typically have a particle size ranging from about 0.01 to 500 micrometers, usually between about 1 to 150 micrometers. In certain cases, it is usually preferred that the inorganic abrasive particles are either the same size or smaller than the plastic abrasive particles. It is preferred that the abrasive particles have a Mohs hardness of at least about 7, more preferably above 9. Examples of such abrasive particles include fused aluminum oxide, ceramic aluminum oxide, boron carbide, titanium diboride, heated treated aluminum oxide, silicon carbide, alumina zirconia, diamond, ceria, cubic boron nitride, garnet and combinations thereof. Ceramic aluminum oxide abrasive grains are further described in U.S. Pat. Nos. 4,314,827 (Leitheiser et al.); U.S. Pat. No. 4,770,671 (Monroe et al.); U.S. Pat. No. 4,744,802 (Schwabel); U.S. Pat. No. 4,623,364 (Cottringer et al.); U.S. Pat. No. 5,164,348 (Wood); and U.S. Pat. No. 5,011,508

(Wald et al.). The term abrasive particles also encompasses when single abrasive particles are bonded together to form an abrasive agglomerate. Abrasive agglomerates are further described in U.S. Pat. Nos. 4,311,489 (Kressner); U.S. Pat. No. 4,652,275 (Bloecher et al.) and U.S. Pat. No. 4,799,939 (Bloecher et al.), all incorporated herein after by reference.

For example, the abrasive filament may comprise between 10 to 90% by weight thermoplastic matrix, between 10 to 90% by weight plastic abrasive particles and between 0 to 49% by weight inorganic abrasive particles.

Additives

Additives, such as lubricants, soaps, antioxidants, UV stabilizers, dye, pigments, wetting agents, surfactants, plasticizers, anti-static agents, anti-rust agents, and other liquid materials may be added to the filaments. One preferred method of incorporating these types of materials into the thermoplastic matrix to encapsulate the liquid materials into a shell that is able to withstand the extrusion temperatures as is well known in the art.

The filament of the invention can further comprise optional additives, such as, for example, fillers (including grinding aids), fibers, antistatic agents, lubricants, wetting agents, surfactants, pigments, dyes, coupling agents, anti-rust agents, plasticizers, and suspending agents, blending directly into the thermoplastic matrix. The amounts of these materials are selected to provide the properties desired.

It is also within the scope of this invention to incorporate inorganic based particulate fillers along with the plastic abrasive particles. Examples of useful fillers for this invention include: metal carbonates (such as calcium carbonate (chalk, calcite, marl, travertine, marble and limestone), calcium magnesium carbonate, sodium carbonate, magnesium carbonate), silica (such as quartz, glass beads, glass bubbles and glass fibers), silicates (such as talc, clays (montmorillonite), feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide (lime), aluminum oxide, titanium dioxide), and metal sulfites (such as calcium sulfite).

A grinding aid is defined as particulate material that the addition of which has a significant effect on the chemical and physical processes of abrading which results in improved performance. In particulate, it is believed in the art that the grinding aid will either 1) decrease the friction between the abrasive grains and the workpiece being abraded, 2) prevent the abrasive grain from "capping", i.e. prevent metal particles from becoming welded to the tops of the abrasive grains, 3) decrease the interface temperature between the abrasive grains the workpiece or 4) decreases the grinding forces. In general, the addition of a grinding aid increases the useful life of the coated abrasive. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene; and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, magnesium chloride. Examples of metals include, tin, lead, bismuth, cobalt, antimony, cadmium, iron titanium. Other miscellaneous grinding aids include sulfur, organic sulfur compounds, graphite and metallic sulfides.

Examples of antistatic agents include graphite, carbon black, vanadium oxide, humectants, and the like.

Toughening Material

The filament may further contain a toughening material. Examples of such toughening materials include rubber type polymers and plasticizers. Specific examples of toughening materials include toluene sulfonamide derivatives, styrene butadiene copolymers polyether backbone polyamide (commercially available from Atochem, under the trade designation "Pebax"), rubber grafted onto polyamide (commercially available from duPont under the trade designation "Zytel FN") and a triblock polymer of styrene-(ethylene butylene)-styrene (commercially available from Shell Chemical Co., under the trade designation "Kraton 1901 X").

Articles

Figure 9:
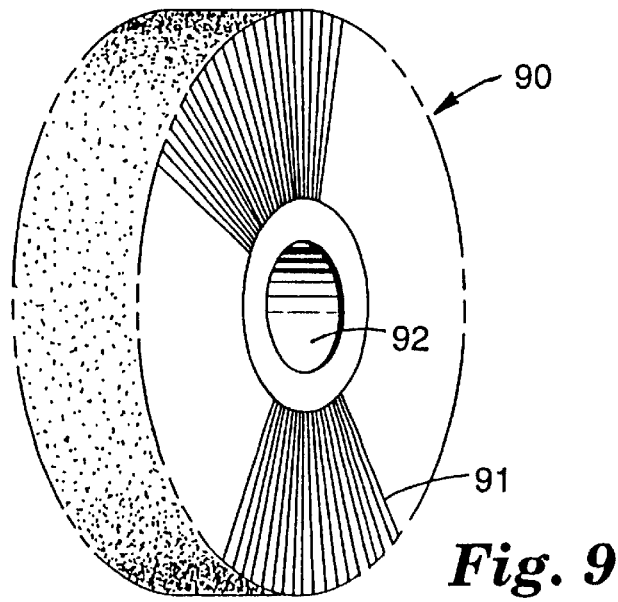
FIG. 9 is a perspective view of an embodiment of a brush tool incorporating filaments according to the present invention.

Composite plastic abrasive particle filaments of the invention may be incorporated into a wide variety of brushes, either assembled to form an open, lofty abrasive pad, or attached to various substrates. FIG. 9 shows one embodiment of a wheel brush 90 within the invention having a plurality of filaments 91 glued or otherwise attached to a hub 92.

The filaments of the invention can be incorporated into brushes of many types and for myriad uses, such as cleaning, deburring, radiusing, imparting decorative finishes onto metal, plastic, and glass substrates, and like uses. Brush types include wheel brushes, cylinder brushes (such as printed circuit cleaning brushes), mini-grinder brushes, floor scrubbing brushes, cup brushes, end brushes, flared cup end brushes, circular flared end cup brushes, coated cup and variable trim end brushes, encapsulated end brushes, pilot bonding brushes, tube brushes of various shapes, coil spring brushes, flue cleaning brushes, chimney and duct brushes, and the like. The filaments in any one brush can of course be the same or different. A nonlimiting list of exemplary brushes in which the plastic particle filled filaments can be used include brushes such as described in U.S. Pat. Nos. 5,016,311, 5,083,840, and 5,233,719 (Young et al.), and U.S. Pat. No. 5,400,458 (Rambosek).

In general, one such brush construction consists of a base layer, a binder layer and the bristles. The bristles are individually and uniformly embedded in the binder such that they project upward and are generally parallel to one another. The base layer and the binder layer can be the same material or different material and in general these layers are polymeric materials. For example the base layer can be a flexible resilient polymeric open cell foam, a polyester material or a polyamide material. In addition, a cotton, polyamide or polyester fabric can be impregnated into these polymeric materials. The binder layer is usually a semi-rigid polymeric material such as a polyurethane, polyester, epoxy or polyamide. In the case where the base and the binder layer are the same, it is preferable to use a polyurethane material. In general the thickness of the base and binder layers can range between 1 to 10 millimeters, preferably 2 to 5 millimeters. The larger the diameter of the bristles, obviously the thicker the binder layer is.

This brush construction can comprise only the abrasive filaments of the invention. Alternatively, the brush construction can comprise a mixture of the abrasive filaments of the invention and conventional filaments. Such conventional filaments include those without abrasive particles, and those including conventional inorganic abrasive particles.

The conventional filaments can be selected from the group consisting of: polyamide, polypropylene, polyester, polyethylene, and metallic fiber. In some cases the filaments can be hollow, which is well known in the brush art. In addition the polymeric filaments may contain abrasive particles such as those well known in the art like silicon carbide and aluminum oxide. The particle size of these abrasive particles will vary depending upon the application, but in general they will range from 10 to 600 micrometers, preferably 15 to 120 micrometers. If the filament contains the abrasive particles, the brush construction material will typically produce a matte type finish on the workpiece. If the filament does not contain abrasive particles, a glossy type finish will typically be produced on the workpiece.

The diameter of the filaments can range from 0.01 to 100 mm, typically 0.05 mm to 50 mm, preferably 0.1 mm to 25 mm, more preferably 0.2 mm to 10 mm and most preferably 0.25 mm to 5 mm. The length of the filament, or trim length, can range from 1 to 1000 millimeters, typically 2 to 100 mm, preferably 3 to 75 mm, more preferably 4 to 50 mm and most preferably 5 to 50 mm.

In some applications the filaments will be nearly perpendicular to the binder layer, in other applications such as conveyor systems, the filaments will be placed at a specified angle or a specified tilt.

Bristles or filaments of t he present invention can be used in other non-abrasive applications, such as for example, hair brushes, paint brushes, car wash brushes, street cleaners, snow blowers, and turf vacuums.

Another embodiment is to provide a bristle having plastic abrasive particles and encapsulated materials therein, Examples of encapsulated materials can include soaps, lubricants, anti-rust agents, and anti-static agents. In a particular embodiment, phosphoric acid (or a similar material) can be added to a bristle comprising plastic abrasive particles. A brush made with such bristles would be useful in the removal and/or neutralization of surface rust on articles such as, for example, automobiles, benches, and swingsets.

Figure 10:
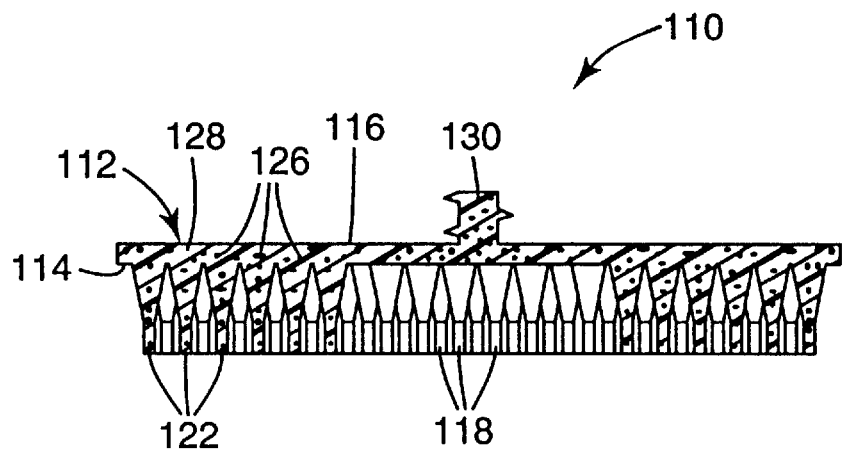
FIG. 10 is a cross sectional view of a first embodiment of a unitary injection molded abrasive brush according to the present invention.
Figure 11:
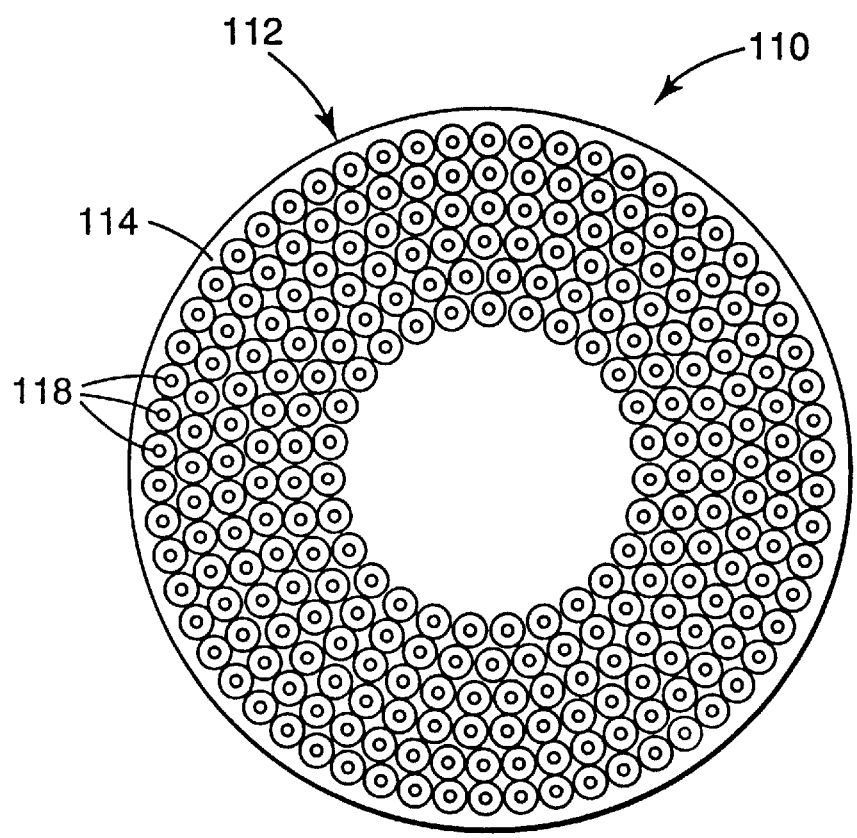
FIG. 11 is a plan view of the abrasive brush of FIG. 10.

FIGS. 10–11 show one preferred embodiment of a unitary injection molded abrasive brush. This molded brush can be made as described in co-pending U.S. Pat. No. 5,679,067, "Molded Abrasive Brush," (Johnson et al.), the entire disclosure of which is incorporated herein by reference. The integrally molded abrasive brush 110 comprises a generally planar flexible base 112 having a first side 114 and a second side 116, and a plurality of filaments or bristles 118 extending from the first side of the base. A suitable attachment means such as threaded stud 130 is preferably provided on the second side of the base. The bristles have an aspect ratio of at least 2 and are integrally molded with the base. The molded abrasive brush comprises a thermoplastic matrix 128 having plastic abrasive particles 126 interspersed throughout at least the bristles. The bristles extend generally perpendicular to the base, parallel to the axis of rotation of the molded abrasive brush.

Figure 12:
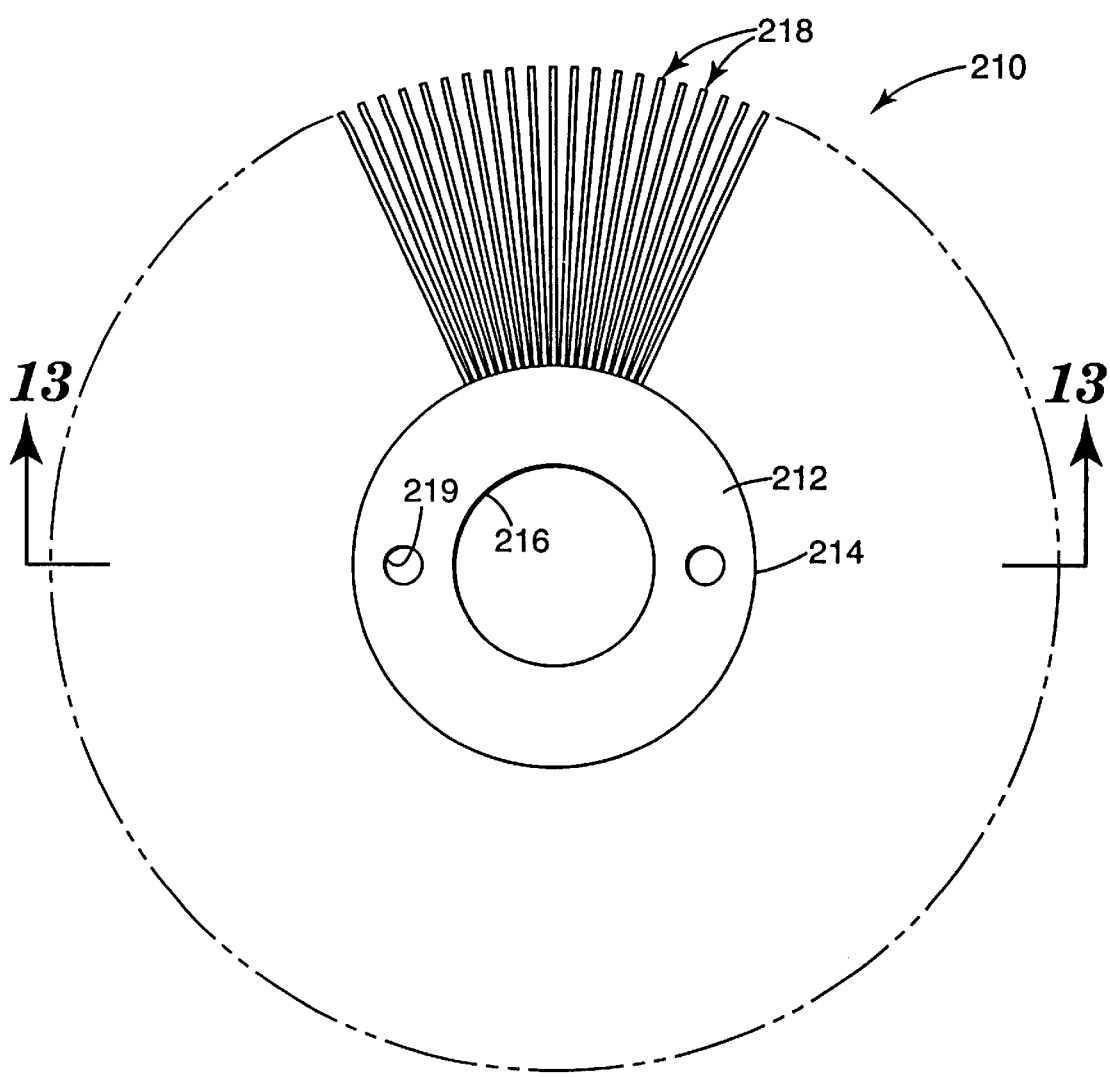
FIG. 12 is a plan view of a second embodiment of a unitary injection molded abrasive brush according to the present invention.
Figure 13:
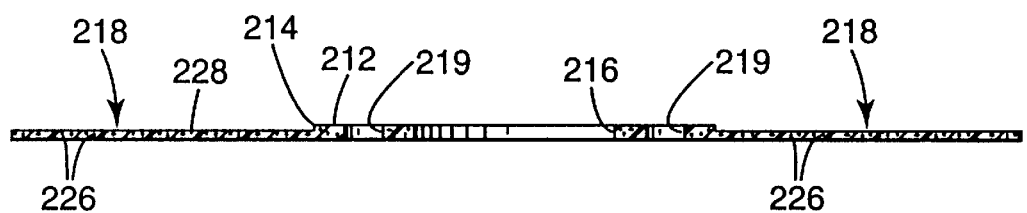
FIG. 13 is a cross sectional view of the brush of FIG. 12, taken along line 13—13.

FIGS. 12–13 show another preferred embodiment of a unitary injection molded brush this brush can be made as is disclosed in U.S. patent application Ser. No. 5,903,951, "Radial Brush Segment," (Ionta et al.) filed even date herewith and assigned to the assignee of the present application, the entire disclosure of which is incorporated herein by reference. Ionta et al. discloses a molded brush segment 210 having a plurality of integrally molded filaments or bristles 218 extending from the outer edge 214 of generally planar center portion 212. The brush segment is molded from a thermoplastic matrix 228 having a plurality of plastic abrasive particles 226 interspersed throughout at least the bristles. The molded brush segments can be generally circular, with the bristles extending radially outward in the plane defined by the central portion. A plurality of brush segments can be combined to form a brush assembly.

Workpiece

The workpiece can be any type of material such as metal, metal alloys, exotic metal alloys, ceramics, glass, wood, wood like materials, composites, painted surface, plastics, reinforced plastic, stones, and combinations thereof. The workpiece may also contain an unwanted layer or coating external over the workpiece surface. This coating may be for example paint, dirt, debris, oil, oxide coating, rust, adhesive, gasket material and the like. The workpiece may be flat or may have a shape or contour associated with it. Examples of workpieces include glass eye glasses, plastic eye glasses, plastic lenses, glass television screens, metal automotive components, plastic components, particle board, cam shafts, crank shafts, kitchen sinks, bath tubs, furniture, turbine blades, painted automotive components, magnetic media, and the like.

Depending upon the application, the force at the abrading interface can range from about 0.1 kg to over 100 kg. Generally this range is between 1 kg to 50 kg of force at the abrading interface. Also depending upon the application, there may be a liquid present during abrading. This liquid can be water and/or an organic compound. Examples of typical organic compounds include lubricants, oils, emulsified organic compounds, cutting fluids, soaps, or the like. These liquids may also contain other additives such as defoamers, degreasers, corrosion inhibitors, or the like. The abrasive article may oscillate at the abrading interface during use. In some instances, this oscillation may result in a finer surface on the workpiece being abraded.

The brush article of the invention can be used by hand or used in combination with a machine to refine a surface by: cleaning a workpiece surface, including removing paint or other coatings, gasket material, corrosion, or other foreign material. At least one or both of the brush and the workpiece is moved relative to the other. The abrasive article or brush can be converted into a belt, tape rolls, disc, sheet, and the like. Typically brush discs are secured to a back-up pad by an attachment means. These brush discs can rotate between 100 to 20,000 revolutions per minute, typically between 1,000 to 15,000 revolutions per minute.

Method of Making Composite Plastic Particle Filaments

In general, a method of making an abrasive filament of the present invention includes the steps of (a) rendering a thermoplastic matrix molten and combining plastic abrasive particles therewith;

(b) extruding the molten thermoplastic matrix and plastic abrasive particles; and (c) cooling the coating to a temperature sufficient to harden the molten thermoplastic matrix and thus form a hardened composition comprising a thermoplastic matrix having plastic abrasive particles interspersed throughout.

A first variation of this method comprises the steps of:

(a) rendering a first thermoplastic matrix molten and combining plastic abrasive particles therewith;

(b) providing a second thermoplastic matrix molten;

(c) coextruding the first thermoplastic matrix and plastic abrasive particles and the second thermoplastic matrix, such that the first thermoplastic matrix and the plastic abrasive particles form a core and the second thermoplastic matrix forms a coating that substantially covers the core;

(d) cooling to a temperature sufficient to harden the molten first and second thermoplastic matrix and thus form an abrasive filament having the core comprising the second thermoplastic matrix and a sheath comprising a first thermoplastic matrix having plastic abrasive particles distributed throughout, wherein the sheath is substantially present over the core.

A second variation of this method comprises the steps of:
(a) rendering a first thermoplastic matrix molten;
(b) rendering a second thermoplastic matrix molten and combining plastic abrasive particles therewith;
(c) coextruding the first thermoplastic matrix and the second thermoplastic matrix and plastic abrasive particles, such that the first thermoplastic matrix forms a core and the second thermoplastic matrix and the plastic abrasive particles form a coating that substantially covers the core;
(d) cooling to a temperature sufficient to harden the molten first and second thermoplastic matrix and thus form an abrasive filament having a core comprising the first thermoplastic matrix, and a sheath comprising the second thermoplastic matrix and the plastic abrasive particles, wherein the sheath is substantially present over the core.

A third variation of this method comprises the steps of:
(a) rendering a first thermoplastic matrix molten and combining first plastic abrasive particles therewith;
(b) providing a second thermoplastic matrix molten and combining second plastic abrasive particles therewith;
(c) coextruding the first thermoplastic matrix and first plastic abrasive particles and the second thermoplastic matrix and second plastic abrasive particles, such that the first thermoplastic matrix and the first plastic abrasive particles form a core and the second thermoplastic matrix and second plastic abrasive particles form a coating that substantially covers the core;
(d) cooling to a temperature sufficient to harden the molten first and second thermoplastic matrixes and thus form an abrasive filament having a core comprising the first thermoplastic matrix and first plastic abrasive particles, and a sheath comprising the second thermoplastic matrix and second plastic abrasive particles, wherein the sheath is substantially present over the core.

The second, third, and fourth variations just described can preferably be performed in accordance with U.S. Pat. No. 5,427,595, Pihl et al., already incorporated by reference. The methods and apparatuses for coextruding core/sheath filaments as taught by Pihl et al. can advantageously be modified as is within the knowledge of those skilled in the art to extrude monofilament embodiments within the scope of the present invention.

A fourth variation of this method comprises the steps of:
(a) rendering a thermoplastic matrix molten and combining plastic abrasive particles therewith;
(b) coating at least a portion of a preformed core with a coating comprising the molten thermoplastic matrix and plastic abrasive particles; and
(c) cooling the coating to a temperature sufficient to harden the molten thermoplastic matrix and thus form a hardened composition comprising a thermoplastic matrix having plastic abrasive particles interspersed throughout.

The just described method of forming composite filaments can preferably be performed in accordance with U.S. Pat. No. 5,460,885, Barber et al., already incorporated by reference.

Such composite filaments can be made by any of a variety of processes taught by Barber et al., including passing one or more preformed cores through a die in which molten, plastic particle filled thermoplastic matrix is coated onto the preformed cores as they move through the die, spray coating plastic particle filled, molten thermoplastic matrix onto a preformed core, or by passing a preformed core through a bath of molten thermoplastic matrix, followed by applying abrasive particles to the molten thermoplastic matrix coating. (Alternatively, the plastic abrasive particles could be in the bath of molten thermoplastic matrix.) Plastic abrasive particles may be applied to a thermoplastic matrix coated core by projecting the plastic abrasive particles toward the thermoplastic matrix coated preformed core by force, such as electrostatic force. However, the preferred method is the first mentioned one, wherein one or more preformed cores are passed through a die which at least partially coats the preformed cores with molten, plastic particle filled thermoplastic matrix, and the molten thermoplastic matrix cooled to form the hardened composition.

A fifth variation of this method comprises the steps of:
(a) rendering a thermoplastic matrix molten and combining plastic abrasive particles therewith;
(b) extruding the thermoplastic matrix and plastic abrasive particles, such that the thermoplastic matrix and the plastic abrasive particles form a sheet-like structure;
(c) cooling the structure to a temperature sufficient to harden the molten thermoplastic matrix and thus form a sheet;
(d) converting the sheet to form filament-like structures.

The converting of the sheet to filament-like structures can be done, for example, by die cutting, water jet cutting, fibrulating, or rotary cutting.

An alternative to the above includes a method of making a unitary injection molded abrasive brush. The method comprises the steps of: a) mixing a thermoplastic matrix and plastic abrasive particles together to form a mixture; b) heating the mixture to form a flowable material; and c) injecting the flowable material under pressure into a mold to form an abrasive brush, wherein the brush comprises: a generally planar flexible base or center portion, and a plurality of bristles extending from the base or center portion, wherein the bristles are integrally molded with the base. Such a method can preferably be performed in accordance with the Johnson et al. patent application or Ionta et al. patent application, both already incorporated by reference.

During the manufacture of the filament, the process and material selection should be designed for the following the conditions. The plastic abrasive particles should not substantially melt or degrade during the extrusion process. Thus, the thermoplastic matrix will typically have a melting point and/or softening point less than the plastic abrasive particles. This will allow the thermoplastic matrix to be rendered molten in the extrusion process, however the thermoplastic abrasive particles will not melt or become molten. Thus, after processing, the plastic abrasive particles will remain as discrete particles within the thermoplastic matrix. The present inventors have surprisingly found the unexpected result that the abrasive filament of the invention can be formed considering that there are two different organic material forming the filament. The organic material forming the thermoplastic matrix melts, while the organic material forming the plastic abrasive particle remains substantially unmelted. Also during processing, the melting and/or extrusion temperature should be such as to not excessively melt and/or degrade the plastic abrasive particles. The surface of the plastic abrasive particles should be relatively "dry", such that during processing gas (i.e., water vapor) is not given off. If gas or volatiles are given off during processing, this may result in undesirable voids or defects in the abrasive filament.

The extruder used can be a single barrel or a twin screw extruder. In addition, a CTM (cavity transfer mixer) can be used. These extruders are known in the art of thermoplastic extrusion. Temperatures, material feed rates, hoppers, and the like are also know.

The plastic abrasive particles can be mixed with the thermoplastic while the thermoplastic is either in the molten or solid state. A single stream of polymer/plastic can be used to produce the filaments of the present invention. In an alternate method, two individual feed streams can be used.

Plastic abrasive particles may be added to the molten thermoplastic matrix through a feed port in the extruder into the molten thermoplastic matrix mass, preferably at point early enough to afford adequate dispersal of plastic abrasive particles throughout the molten thermoplastic matrix. Alternatively, plastic abrasive particles may be distributed in the molten thermoplastic matrix coating via a second step (i.e. after the preformed core has been coated with molten thermoplastic matrix), such as by electrostatic coating.

The filaments of the present invention comprising thermoplastic and plastic abrasive particles can be extruded into cross-sectional shapes such as circles, ovals, and ellipses, polygons such as, for example, squares, rectangles, hexagons, and trapezoids, stars, and any other shape.

A cold water quench is preferably located immediately downstream of the die through which the molten extruded or coextruded filament or the thermoplastic matrix coated preformed core passes to achieve rapid cooling of the molten thermoplastic matrix to form a hardened composition comprising thermoplastic matrix and plastic particle particles. A process wherein multiple preformed cores are coated simultaneously or multiple filaments are extruded or coextruded may be preferable from the standpoint of mass producing plastic particle filaments. This may be accomplished using a manifold arrangement. In this case, more than one wind up roll may be required.

The plastic abrasive filament may then be cut to individual plastic particle filaments having the desired length. Although it is within the scope of this invention to orient the filaments to increase their tensile strength prior to use, it is not necessary to do so.

After the molten, plastic particle filament has hardened, the filaments may have a coating (e.g. a plastic coating) applied thereover. It is also within the scope of this invention to have the plastic abrasive particles protrude out of the filament.

EXAMPLES

The following examples are given as illustrations of the invention and are not intended as limitations thereof In all examples, all parts and percentages are by weight unless otherwise stated. The "grade" of plastic abrasive particles refers to that used by the Grinding Wheel Institute (ANSI ASC B74. 18-1984).

Example 1

Example 1 was an extruded plastic abrasive filament having a monofilament configuration generally in accordance with the embodiment described with reference to FIG. 1. The extruder was a Werner/Pfleiderer ZSK30 co-rotating twin screw extruder with 7 heated barrel zones. The extruder was fitted with two 30 mm diameter co-rotating screws having an L/D ratio of 30:1. The die on the extruder was as taught by U.S. Pat. No. 5,427,595, operated as a monofilament extruder rather than as a. coextruder.

A composition was prepared containing a combination of "Hytrel 6356", a polyester based thermoplastic elastomer from E.I. DuPont de Nemours and Company, Inc., and 20 wt-% "BY27-010", a polyester elastomer based polymer melt additive available from Dow Corning Company (also known as "MB50-010"). This composition was fed into the extruder at rate of 31.7 grams per minute. The extruder rotated at 350 rpm, and the pressure within the extruder was 200 psi. The thermoplastic matrix was first rendered molten by the extruder, after which polyester abrasive particles were added at a rate of approximately 8 grams per minutes through a feed port of the extruder barrel. The plastic abrasive particles were commercially available from U.S. Technology Corp. under the trade designation "Polyextra Plastic Blast Media", have a MOH's hardness of 3, 30/40 mesh size, and had been dried overnight at 121° C. before using.

The temperatures in the various extruder zones were as follows: barrel zones 1 through 7: (C°) 246°, 254°, 257°, 251°, 251°, 246°, 227°; adapter zones 8 through 11: (C°) 227°, 221°, 227°, 227°; Die zone 12: (C°) 238°.

Two filaments were pulled at 12.2 meters/min (40 fpm), through a water quench tank placed about 25 mm from the face of the extrusion die, after which the filaments were wound up on a 76.2 cm (30 inch) diameter collecting drum. A bundle approximately 5 cm (2 in) in diameter was cut off the winder and wrapped to form a rigid, straight bundle. Sections were cut off the bundle to a length of 1.59 cm (⅝ in).

A silastic rubber mold having a 0.95 cm (⅜ in) diameter central hole for inserting a threaded attachment button (taught by U.S. Pat. No. 3,562,968 (Johnson et al.) and known commercially as "Roloc") was used to form the backing. The mold reservoir was 5 cm (2 in) diameter by 0.635 cm (¼ in) deep. After the attachment button was in place, a 9:1 weight ratio of "Adiprene LF600D" from Uniroyal and "Ethicure 300" from Ethyl Chemicals was mixed at room temperature and poured into the reservoir to a depth of about 0.47 cm (3/16 in). The mixture surrounded the flange of the button so when cured the button was held firmly in place. After the pouring was complete a plastic bristle guide plate was placed over the mold so that the mold and plate were concentric. The guide plate had holes through it to direct placement of the bristles and hold them vertical until curing was complete. Then, 384 extruded bristles were manually placed in the Adiprene/Ethicure mixture so that about 1.27 cm (½ in) of bristle extended from the base. The entire assembly was placed in an oven at 86° C. for one hour for curing. Once cured, the backing and the guide plate were lifted off the bristles. The resulting brush was then ready for testing on a right angle power tool.

The brush was attached to a right angle, air driven power tool, a 20,000 rpm Ingersoll Rand model Cyclone CA200 rated at 0.35 HP. The tool was fitted with a 5 cm (2 in) backup pad. The brush was used to remove black enamel paint from a cold rolled steel 0.8 mm (0.032 inch) thick panel from ACT Laboratories, Inc., of Hillsdale, Mich. The brush was observed to remove paint without damaging or scratching the surface of the metal.

Example 2

Example 2 was prepared as described in Example 1, except that 192 extruded bristles were manually placed in the Adiprene/Ethicure mixture so that about 1 cm (3/8 in) bristle extended from the base. Example 2 was tested as described with respect to Example 1, and was observed to remove paint from the workpiece without damaging or scratching the surface of the metal.

Example 3

Example 3 was a unitary injection molded brush that was molded generally in accordance with the teachings of the '910 Johnson et al. patent application discussed above. The extruder was a 75 ton Van Dorn single shot extruder with a toggle clamping system, a 54 gram (3 ounce) barrel and a general purpose screw.

A composition was prepared containing a combination of 90 wt-% "Hytrel" 5526, a polyester based thermoplastic elastomer from E.I. DuPont de Nemours and Company, Inc. and 10 wt-% "BY27-010", and 30 wt-% based on 100% for the combination of the components of a plastic abrasive "MC-3", 30/40 mesh size untreated plastic blasting media available from Maxi-Blast Company of South Bend, Ind. Prior to molding, each of the compounds were dried at 79° C. (175° F.) for 4 hours in a Bryant air dryer.

The base of the brushes had a diameter of 5 cm (2 in), and a thickness of 2.54 mm (0.1 in). The brush had 254 integrally molded bristles. Each bristle was 1.27 mm (0.50 in) long and tapered from 2.54 mm (0.10 in) diameter at the root to 1.27 mm (0.05 in) diameter at 80% of the length from root to the tip, and had a diameter of 1.27 mm (0.05 in) for the remainder of the length to tip. The fillet radius at the base of the bristles was approximately 0.64 mm (0.025 in). Each brush included an integrally molded threaded stud as the attachment means according to U.S. Pat. No. 3,562,968 (Johnson et al.).

To determine if the abrasive brushes were suitable for use on aluminum workpieces, brushes were tested on an apparatus that applied a load of 1.8 kg (4 lb.) for 20 seconds, then lifted for 11 seconds. This was repeated for 30 cycles for a total test time of 10 minutes on the workpiece. The workpiece was a flat plate of 5052 aluminum, 38.1×38.1 cm×0.32 cm (15×15×1/8 inch) with a 0.64 cm (1/4 inch) central hole to mount it on the test apparatus. The plate was rotated at about 1 revolution every 3 minutes. The abrasive brush was mounted on an Ingersoll-Rand cyclone series right angle grinder, model TA 180 RG4 rated at 18,000 rpm and 0.70 hp. The abrasive brush was run at 18,000 RPM free spinning (actual RPM under load was somewhat less). The abrasive brush was held at a 7° angle to the workpiece. The workpieces were weighed before and after the test, and brushes caused no material loss on the workpiece.

Brushes constructed in accordance with Example 3 were also used as follows. The brushes were used with hand held rotary tools to remove gaskets from aluminum automobile engine blocks, and were observed to successfully remove the gasket material without removing material from the engine block. Brushes were also used with hand held rotary tools to remove the outer coating of paint while leaving on the workpiece a primer coat or an e-coat on test panels from ACT Laboratories, Inc., of Hillsdale, Mich., prepared as follows:

Panel 1
material: cold rolled steel, 0.81 mm (0.032 inches) thick, unpolished
designation: B952 P60 DIW
primer: GPX05379
basecoat: E98 KD405 black
clearcoat: E126CD005 stainguard 3

Panel 2
material: cold rolled steel, 0.81 mm (0.032 inches) thick, unpolished
designation: C168 C20 DIW
e-coat: ED3150A
primer: 80-1146 (GPX5028)
basecoat: 872AB921 black
clearcoat: RK3840
paint spec.: 998-4065

The present invention has now been described with reference to several embodiments thereof The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An abrasive brush comprising:
    (a) a plurality of abrasive filaments having an aspect ratio of at least 1, said filaments comprising a thermoplastic matrix and a plurality of abrasive particles interspersed throughout at least a portion of said thermoplastic matrix, wherein said abrasive particles comprise thermosetting or thermoplastic polymer, and
    (b) means for securing said plurality of abrasive filaments together to form a brush.

2. The brush of claim 1, wherein said abrasive particles have a knoop hardness of less than 80.

3. The brush of claim 1, wherein said abrasive particles are substantially uniformly interspersed throughout said filament.

4. The brush of claim 1, wherein said thermoplastic matrix comprises a thermoplastic elastomer.

5. The brush of claim 4, wherein said thermoplastic elastomer comprises a segmented thermoplastic elastomer.

6. The brush of claim 1, wherein said abrasive particles comprise a weight percent based on the total weight of thermoplastic matrix and plastic abrasive particles of about 0.1 to about 80 wt-%.

7. The brush of claim 1, wherein said abrasive particles have a higher melt temperature than said thermoplastic matrix.

8. The brush of claim 1, wherein said abrasive particles have a knoop hardness greater than the knoop hardness of said thermoplastic matrix.

9. The brush of claim 1, wherein said abrasive particles comprise a thermoplastic polymer.

10. The brush of claim 1, wherein said filaments comprise:
    (a) about 10 to 90 wt-% of said thermoplastic matrix; and
    (b) about 10 to 90 wt-% of said abrasive particles.

11. The brush of claim 1, wherein said brush comprises a unitary injection molded brush.

12. The brush of claim 11, wherein said brush further includes a generally planar base, and wherein said filaments are integrally molded with said base.

13. The brush of claim 12, wherein said filaments are generally perpendicular to said base.

14. The brush of claim 11, wherein said brush further includes a planar center portion, and wherein said filaments are integrally molded with said center portion and are generally parallel to said center portion.

15. The brush of claim 1, wherein said brush further includes a cylindrical hub, and wherein said filaments are bonded to said hub.

16. The brush of claim 1, wherein said filaments comprise a core and a sheath substantially covering said core, and wherein at least one of said sheath and said core comprise said thermoplastic matrix having said abrasive particles interspersed throughout at least a portion thereof.

17. The brush of claim 16, wherein said sheath comprises said abrasive particles interspersed throughout at least a portion of said thermoplastic matrix.

18. The brush of claim 16, wherein said core comprises said abrasive particles interspersed throughout at least a portion of said thermoplastic matrix.

19. The brush of claim 16, wherein said core comprises a first thermoplastic matrix having a first plurality of said abrasive particles interspersed throughout at least a portion thereof, and wherein said sheath comprises a second thermoplastic matrix having a second plurality of said abrasive particles interspersed throughout at least a portion thereof.

20. The brush of claim 16, wherein one of said sheath and said core comprises said abrasive particles, and wherein the other of said core and said sheath comprises a second plurality of abrasive particles wherein said second plurality of abrasive particles comprise inorganic abrasive particles.

21. The brush of claim 1, wherein said abrasive particles comprise precisely shaped particles.

22. The brush of claim 21, wherein said shaped particles include abrasive grit.

* * * * *

UNITED STATES PATENT AND TRADEMARK OFFICE
CERTIFICATE OF CORRECTION

PATENT NO. : 6,352,471 B1
DATED : March 5, 2002
INVENTOR(S) : Bange, Donna W.

It is certified that error appears in the above-identified patent and that said Letters Patent is hereby corrected as shown below:

Column 2,
Line 67, insert -- . -- following "matrix".

Column 3,
Lines 10 and 18, insert -- . -- following "thereof".
Line 18, insert -- does -- preceding "not".
Line 42, "butadienestyrene" should read -- butadiene-styrene. --
Line 44, insert -- . -- following "thereof".

Column 7,
Line 58, insert -- . -- following "thereof".

Column 8,
Line 11, insert -- . -- following "thereof".

Column 12,
Line 48, "butadienestyrene" should read -- butadien-styrene --.

Column 14,
Line 11, "I" should read -- 1 --.
Line 37, insert -- . -- following "thereof".

Column 15,
Line 3, insert -- . -- following "therefor".

Column 19,
Line 26, "t he" should read -- the --.

Column 20,
Line 47, insert -- : -- following "of".

UNITED STATES PATENT AND TRADEMARK OFFICE
CERTIFICATE OF CORRECTION

PATENT NO. : 6,352,471 B1
DATED : March 5, 2002
INVENTOR(S) : Bange, Donna W.

It is certified that error appears in the above-identified patent and that said Letters Patent is hereby corrected as shown below:

Column 23,
Line 55, insert -- . -- following "thereof".

Column 24,
Line 4, delete "." following "a".

Column 26,
Line 13, insert -- . -- following "thereof".

Signed and Sealed this

Seventeenth Day of June, 2003

JAMES E. ROGAN
*Director of the United States Patent and Trademark Office*